(12) United States Patent
Bertin

(10) Patent No.: US 8,819,431 B2
(45) Date of Patent: Aug. 26, 2014

(54) METHODS AND DEVICE FOR ELECTRONIC ENTITIES FOR THE EXCHANGE AND USE OF RIGHTS

(75) Inventor: Marc Bertin, La Celle les Bordes (FR)

(73) Assignee: Oberthur Technologies, Colombes (FR)

( * ) Notice: Subject to any disclaimer, the term of this patent is extended or adjusted under 35 U.S.C. 154(b) by 955 days.

(21) Appl. No.: 12/480,119

(22) Filed: Jun. 8, 2009

(65) Prior Publication Data

US 2009/0307494 A1  Dec. 10, 2009

(30) Foreign Application Priority Data

Jun. 6, 2008 (FR) .................................. 08 53798

(51) Int. Cl.
*H04L 9/32* (2006.01)
*H04B 7/00* (2006.01)
*H04K 1/00* (2006.01)

(52) U.S. Cl.
USPC ........... 713/170; 713/169; 713/171; 380/270; 380/278; 455/41.2; 455/3.01

(58) Field of Classification Search
USPC .......... 380/270, 273, 278; 713/170, 168, 183, 713/169, 171
See application file for complete search history.

(56) References Cited

U.S. PATENT DOCUMENTS

| 7,114,179 B1* | 9/2006 | Ritter et al. ...................... 726/7 |
| 2006/0133613 A1* | 6/2006 | Ando et al. .................... 380/270 |
| 2007/0155306 A1* | 7/2007 | Koli et al. ..................... 455/3.01 |
| 2009/0286511 A1* | 11/2009 | Petit et al. ...................... 455/411 |
| 2009/0313689 A1* | 12/2009 | Nystrom et al. .................. 726/9 |

FOREIGN PATENT DOCUMENTS

| EP | 1 369 829 | 12/2003 |
| WO | 00/62260 | 10/2000 |
| WO | 2007/132056 | 11/2007 |

OTHER PUBLICATIONS http://www.digital21.gov.hk/eng/related_documents/download/D21ConsultationPaper(E).pdf "Public Consultation on Digital 21 Strategy"—Commerce, Industry and Technology Bureau / The Government of the Hong Kong Special Administrative Region, Oct. 2006.*
French Search Report dated Feb. 27, 2009, from corresponding French application.

* cited by examiner

*Primary Examiner* — Randy Scott
(74) *Attorney, Agent, or Firm* — Young & Thompson

(57) ABSTRACT

A method of transferring an item of data representative of a right between two electronic entities, at least one of the electronic entities including short range wireless communication elements suitable for transmitting the item of data to use the right, the electronic entities being suitable for communicating directly or indirectly via a long range communication interface. The method includes steps of transmission and of reception of the item of data by the electronic entities, the item of data being transmitted via the long range communication interface, of authentication and of storage of the item of data in the electronic entity having received it.

18 Claims, 4 Drawing Sheets

METHODS AND DEVICE FOR ELECTRONIC ENTITIES FOR THE EXCHANGE AND USE OF RIGHTS

BACKGROUND OF THE INVENTION

1. Field of the Invention

Figure 1:
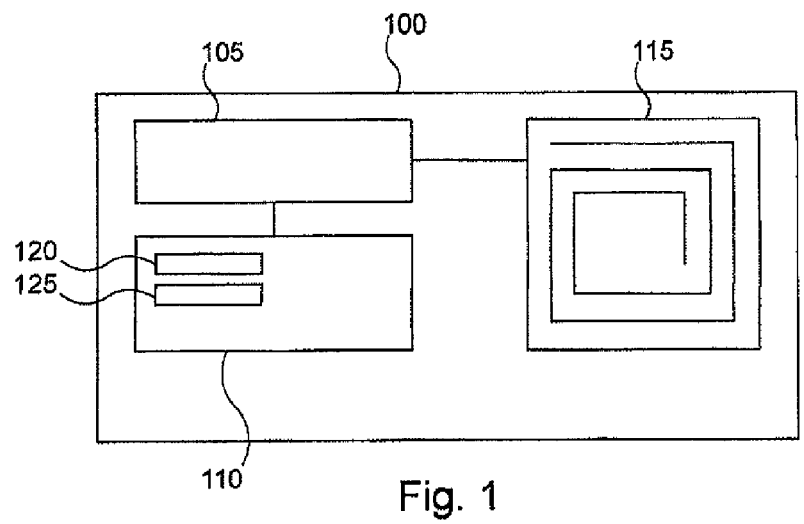

The present invention relates to the exchange of rights, for example of monetary values, of loyalty points, of purchase or subscription orders and/or of rights to a multimedia content, and more particularly methods and a device for electronic entities, preferably portable, for the exchange and the use of such rights.

2. Description of the Related Art

The evolution of communication networks, in particular the Internet, has contributed to the development of new methods of distributing goods and services which have themselves driven the implementation of new payment means. For example, payment via a communication network, also called online payment, enables a user, after having ordered an article or a service, to provide banking information, an amount and an authorization to a trusted third party in order for the latter to transmit a transaction request to the computer system of the relevant banking establishment.

However, while the means of payment between several companies or between individuals and companies have been the source of numerous developments, few systems allow an exchange of rights or of amounts of values, simple and secured, between several individuals.

There are, on the one hand, electronic purses enabling a debitor to pay a monetary sum to a creditor, the debitor and the creditor being physically close to one another at the time of the transaction. According to these systems, a payment card is capable of storing a number representing a monetary amount. This card can be credited, or topped up, using an appropriate device. It is debited on each payment. This method of payment does not generally implement any mechanism for checking the consent of the card holder through his authentication; it is often an anonymous method of payment, like a cash payment. However, such a means of payment can be used only for small transactions. Moreover, the creditor must have a device that is suitable for reading the card, by contact or without contact, to receive the cash.

There are, on the other hand, systems, such as the system described in the patent application WO 03/023574, that enable a debitor to pay, from one of his accounts, a monetary sum to an account of a creditor, the debitor and the creditor not necessarily being close to one another at the time of the transaction. Thus, a monetary transfer can be made between two individuals provided with electronic entities such as mobile phones. The transactions are in this case handled via a central system which stores the accounts of the users and their profiles. Such profiles provide a means of storing the banking information of the users and performing the necessary checks. Such a solution requires the identity of the creditor to be entered and the accounts of the users to be managed centrally.

The invention provides a way of solving at least one of the problems explained above.

SUMMARY OF THE INVENTION

An object of the invention is thus a method of transferring at least one item of data representative of at least one right between two electronic entities, at least one of said electronic entities comprising short range wireless communication means suitable for transmitting said at least one item of data to use said at least one right, said electronic entities being suitable for communicating directly or indirectly via a long range communication interface, the method comprising the following steps, reception of said at least one item of data by one of said electronic entities, said at least one item of data being received from the other of said electronic entities, said at least one item of data being transmitted via said long range communication interface;

authentication of said at least one item of data by said one of said electronic entities; and storage of said at least one item of data in said one of said electronic entities.

The method according to the invention thus makes it possible to transfer rights between electronic entities, remotely, without the need for the intervention of a third party, in particular a manager of an account of the bank account type, using different communication technologies such as electronic mail, SMS (short message service) and MMS (multimedia message service).

Advantageously, the method also comprises a step of use of said at least one right represented by said at least one item of data implementing said short range wireless communication means.

According to a particular embodiment, said step of reception of said at least one item of data comprises a step of reception of said at least one item of data from an electronic device distinct from said electronic entities implementing said short range wireless communication means. The right transfer is thus performed simply via an electronic device by using the means of the latter.

Again according to a particular embodiment, said reception step comprises a step of reception of an application suitable for processing said at least one received item of data. There is thus no need to have a particular application to process a transaction.

Another object of the invention is a method of transferring at least one item of data representative of at least one right between two electronic entities, at least one of said electronic entities comprising short range wireless communication means suitable for transmitting said at least one item of data to use said at least one right, said electronic entities being suitable for communicating directly or indirectly via a long range communication interface, the method comprising the following steps, signing of said at least one item of data by one of said electronic entities; and transmission of said at least one signed item of data to the other of said electronic entities, said at least one signed item of data being transmitted via said long range communication interface.

The method according to the invention thus makes it possible to transfer rights between electronic entities, remotely, without requiring the intervention of a third party, in particular a manager of an account of the bank account type, using different communication technologies such as electronic mail and SMSs.

According to a particular embodiment, said signing step comprises a step of selection of a cryptographic key stored in said one of said electronic entities to sign said at least one item of data. The method according to the invention thus makes it possible to manage several cryptographic keys enabling rights to be transferred with several electronic entities.

Advantageously, the method also comprises a step of encryption of said at least one item of data in order to secure the right transfer.

According to a particular embodiment, said step of transmission of said at least one signed item of data to the other of said electronic entities comprises a step of transmission of said at least one signed item of data to an electronic device distinct from said electronic entities implementing said short range wireless communication means. The right transfer is thus performed simply via an electronic device by using the means of the latter.

Again according to a particular embodiment, said at least one item of data is transmitted in a message of electronic message, SMS or MMS type.

Another object of the invention is a computer program comprising instructions suitable for implementing each of the steps of the method described previously.

Another subject of the invention is a device for transferring at least one item of data representative of at least one right between two electronic entities, the device comprising the following means,

- short range communication means suitable for transmitting said at least one item of data to use said at least one right;
- communication means suitable for transmitting said at least one item of data between said electronic entities via long range communication means;
- storage means suitable for storing said at least one item of data; and
- processing means suitable for receiving or transmitting said at least one item of data and for using said at least one right associated with said at least one item of data.

The device according to the invention thus makes it possible to transfer rights between electronic entities, remotely, without requiring the intervention of a third party, in particular a manager of an account of the bank account type, using different communication technologies such as electronic mail and SMSs.

Advantageously, said processing means comprise cryptographic means suitable for signing, encrypting, authenticating and/or decrypting said at least one item of data to secure the transfer of rights.

Advantageously, said storage means are suitable for storing an application for processing said at least one item of data.

According to a particular embodiment, said short range communication means are suitable for transmitting said at least one item of data between said storage means and said long range communication means. It is thus possible to easily use the communication means of an electronic device.

Again according to a particular embodiment, said short range communication means conform to the NFC standard.

Again according to a particular embodiment, said long range communication means are at least partially of mobile telephony type and/or comprise a network interface of Internet type.

BRIEF DESCRIPTION OF THE DRAWING FIGURES

Figure 2:
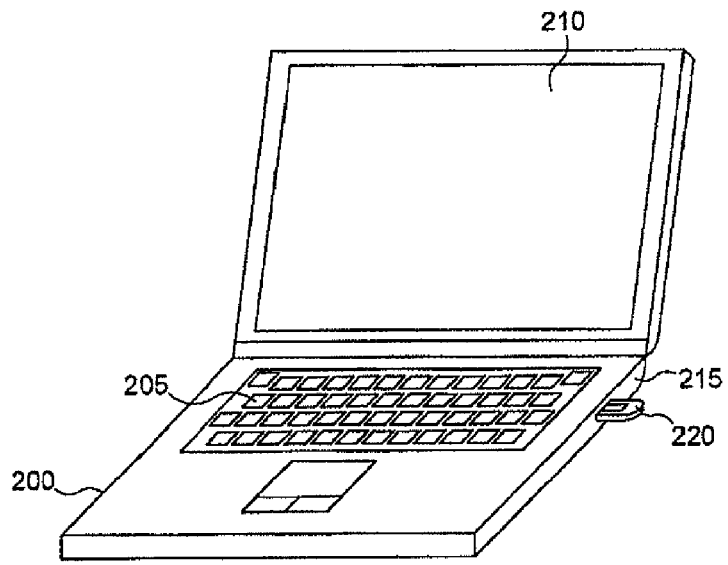
Figure 3:
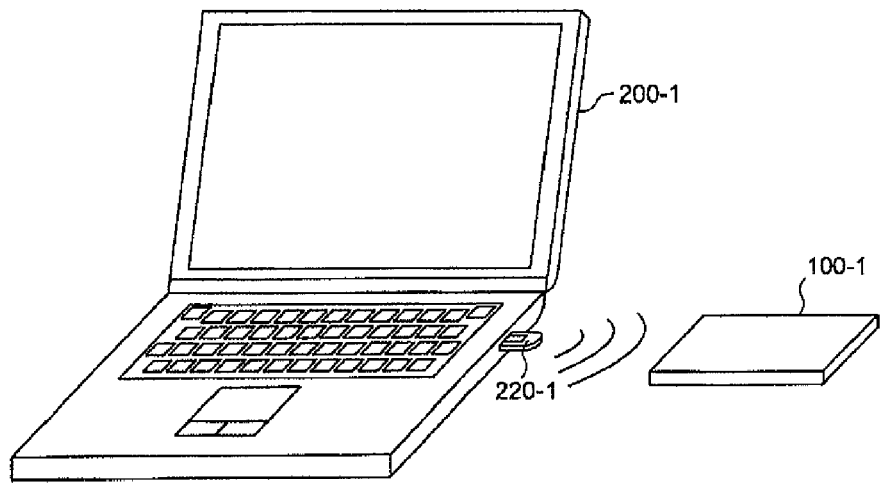
Figure 3:
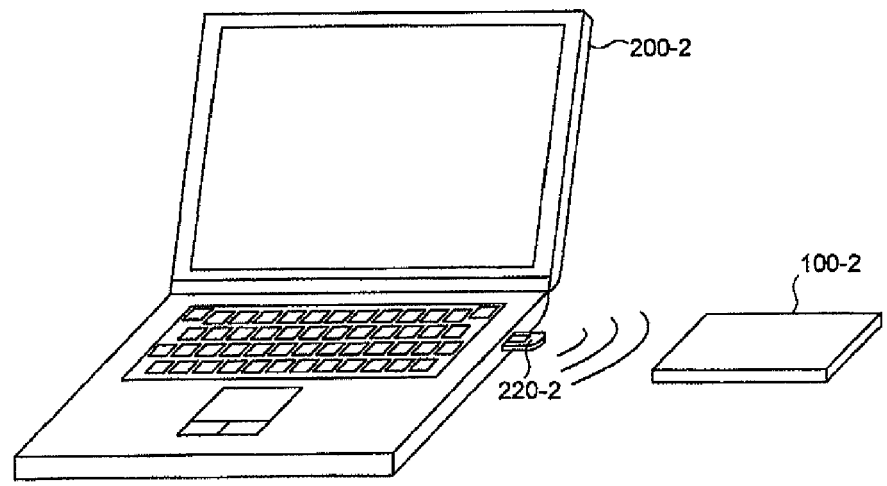
Figure 4:
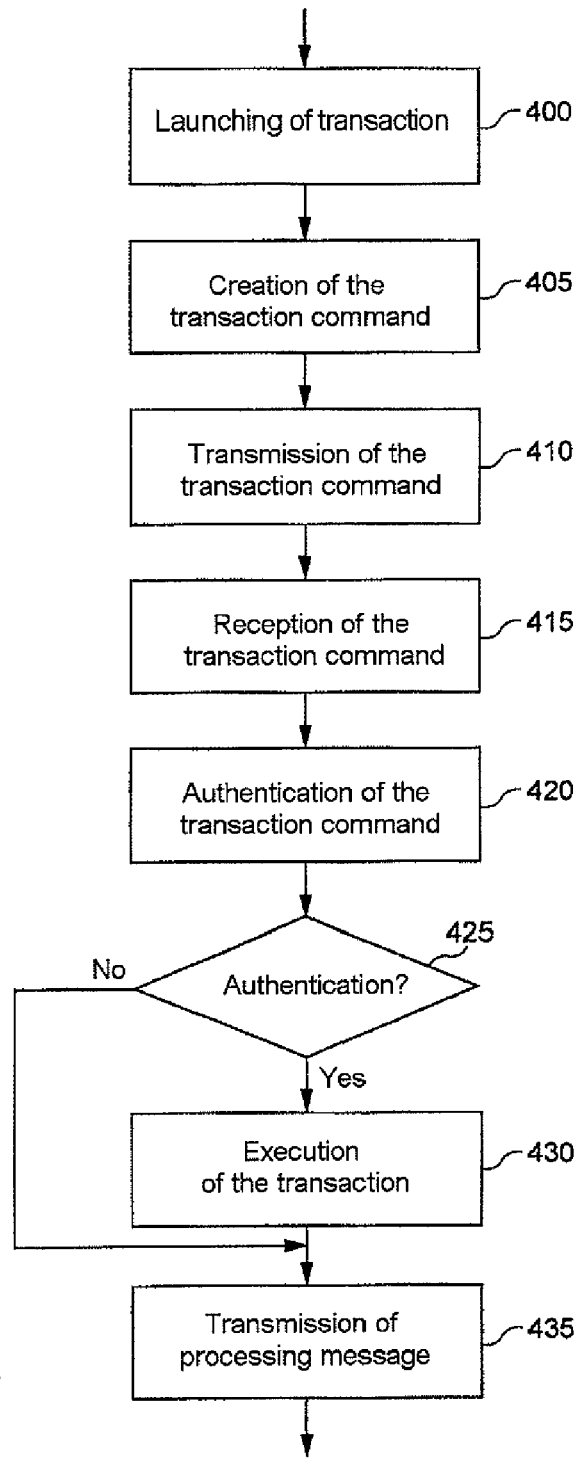
Figure 5:
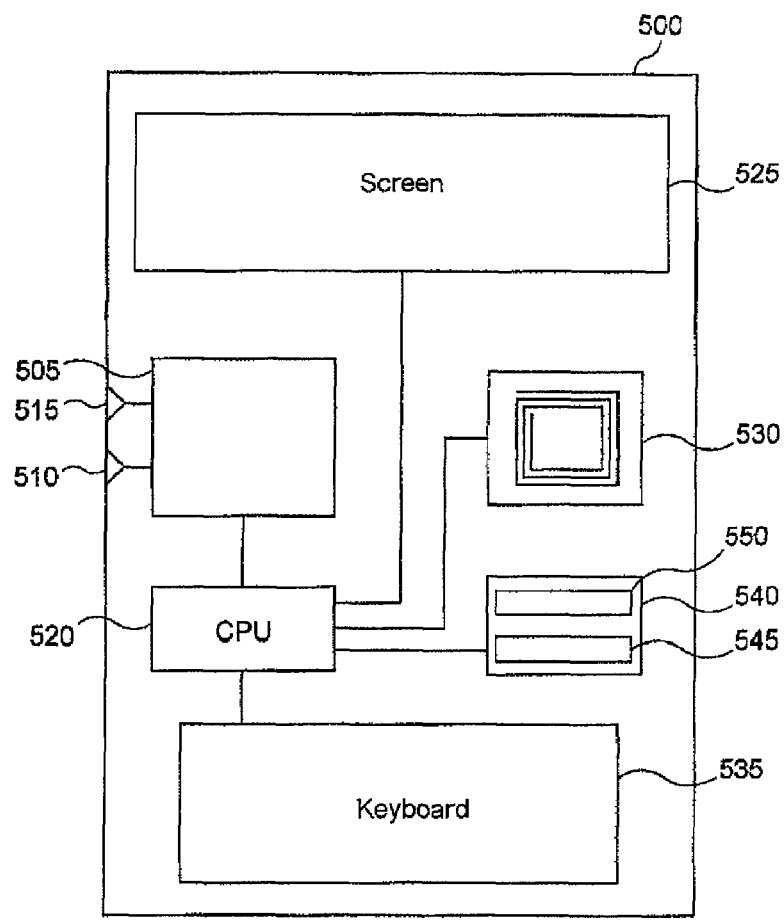

Other advantages, aims and characteristics of the present invention will become apparent from the detailed description that follows, given by way of nonlimiting example, in light of the appended drawings in which:

FIG. 1 diagrammatically represents a first exemplary portable electronic entity making it possible to implement the invention;

FIG. 2 illustrates an exemplary electronic device suitable for transmitting data representative of rights between several portable electronic entities such as that represented in FIG. 1;

FIG. 3 diagrammatically represents a system suitable for transferring data representative of rights between two portable electronic entities such as that illustrated in FIG. 1 using two electronic devices such as that represented in FIG. 2;

FIG. 4 illustrates an exemplary algorithm that can be used to implement the invention in the system illustrated in FIG. 3; and FIG. 5 illustrates a second exemplary portable electronic entity suitable for implementing the invention.

DETAILED DESCRIPTION OF THE INVENTION

The invention enables a debitor provided with an electronic entity to transmit a right or an amount of values, stored in that electronic entity, to a creditor also provided with an electronic entity.

The electronic entity of the creditor is in this case provided with short range wireless communication means allowing, for example, a communication at a maximum distance of a meter, 50 cm or 20 cm. These short range wireless communication means advantageously conform to the ISO 14443 standard, or to the NFC (near field communication) standard.

The electronic entity of the creditor also comprises means making it possible to use a right or an amount of values stored in a memory of the electronic entity to access a service or a multimedia content via these short range wireless communication means.

The electronic entity of the debitor is advantageously similar to that of the creditor and thus, preferably, comprises these short range wireless communication means and these means making it possible to use a right or an amount of values.

The electronic entities are preferably portable or of pocket type. They can be, for example, a mobile phone, a personal assistant, also called PDA (personal digital assistant), a USB (universal serial bus) key, or a microcircuit card, in particular a card conforming to the ISO 7816 standard.

According to a particular embodiment, the electronic entity of the debitor is also provided with short range wireless communication means. The electronic entities of the debitor and of the creditor are thus capable of each connecting to an electronic device also comprising short range wireless communication means.

The electronic devices are in this case provided with long range communication means, preferably wireless, allowing, for example, a communication at a distance greater than 100 meters or than a kilometer, to enable the exchange of rights or amounts of values between the electronic entities.

Such communication means are, for example, telephone communication means, in particular GSM (global system for mobile communications) or GPRS (general packet radio service). Alternatively, these communication means make it possible to access a data communication network such as the Internet. Such communication means are, by way of illustration, compatible with at least one of the WiFi or Ethernet standards.

Alternatively, at least one of the electronic entities of the debitor or of the creditor comprises such long range communication means so that there is no need to connect this electronic entity to an electronic device to exchange rights or amounts of values between the electronic entities.

The rights and the amounts of values are, for example, rights to access services, in particular cinema, museum, swimming pool or theme park, subscriptions to access a service such as transport or telecommunication subscriptions, payment units such as that contained in an electronic purse, loyalty points or rights to access a multimedia content.

The right can also consist of a cryptographic key or an instruction to modify a right associated with an electronic entity.

The right or the amount of values takes the form of information stored in memory of the electronic entity.

When it concerns a right to access a service, the electronic entity uses the right to give access to the service, for example by being authenticated. The electronic entity thus gives an authorization. To these ends, the electronic entity has a cryptographic key enabling the authentication. The electronic entity can also have means of storing rights units. It can then delete or decrement the rights as they are used up, for example through their use, and also allow these rights to be topped up by an authorized entity and, preferably, authenticated by cryptographic means. The rights can thus be monetary units, cinema seats, a transport subscription (without unit) or telephone units. When there is no longer a right, the electronic entity no longer gives authorization.

The same can apply when the right is a right to play back a digital content, for example to play back a video film on a video screen, typically entertainment. The digital content is, for example, stored in the electronic entity or in a host station. The electronic entity can store, in this case too, a cryptographic key and/or rights units.

The right can also be the content itself.

In all cases, the authorization or the authentication of the electronic entity to use the right is performed according to the invention by short range wireless communication means.

FIG. 1 diagrammatically represents a first exemplary electronic entity making it possible to implement the invention, for example a portable electronic entity of microcircuit card type. As illustrated, the portable electronic entity 100 in this case comprises a central processing unit 105, also called CPU, a memory 110, preferably non-volatile, for example a memory of EPROM (erasable programmable read-only memory) type and an antenna 115 enabling the exchange of data according to a short range wireless communication mode.

The memory 110 is in particular adapted to store one or more data 120 representative of rights and one or more cryptographic keys 125.

The memory 110 is also suitable for storing an application that can be used by the electronic entity to perform, at least partially, a transaction relating to a right and to enable the use of this right.

According to a particular embodiment, the memory 110 can be used to store another application that can be transmitted to an electronic device to which the electronic entity is connected and used by the latter to perform, at least partially, a transaction relating to a right.

The central processing unit 105 comprises cryptographic means suitable for signing the data 120 representative of rights when these rights are transmitted, or a portion of them, using a cryptographic key 125. Such means can be software or hardware. Similarly, the cryptographic means of the central processing unit 105 are, preferably, suitable for authenticating a received item of data that is representative of a right based on a cryptographic key 125.

FIG. 2 illustrates an electronic device suitable for communicating with the electronic entity represented in FIG. 1. The electronic device represented is in this case a portable computer 200 of PC (personal computer) type. It comprises input means 205, for example a keyboard and a touchpad, a display screen 210 and a long range communication interface 215. The interface 215 is, for example, of Ethernet or WiFi type.

The electronic device 200 also comprises short range communication means enabling it to exchange data with the electronic entity 100 represented in FIG. 1. The electronic device 200 in this case comprises a connector of USB type to which is linked a USB key 220 comprising such short range wireless communication means. Thus, according to this example, the data exchanged between the electronic device 200 and the electronic entity 100 passes via the USB key 220. Alternatively, the short range wireless communication means can be directly incorporated in the electronic device 200.

The electronic device 200 can be used to exchange data representative of rights between two electronic entities or to use such rights, in particular to access services. For example, the electronic device 200 can be linked to an automatic barrier, the opening of which is conditional on a right, of which the representative data is contained in an electronic entity, the item of data representative of this right being transmitted according to a short range wireless communication mode.

FIG. 3 illustrates an exemplary implementation of the invention for exchanging data representative of rights between two portable electronic entities such as that illustrated in FIG. 1 using two devices such as that represented in FIG. 2.

As illustrated, the electronic entities 100-1 and 100-2 are suitable for connecting to the devices 200-1 and 200-2 via the USB keys 220-1 and 220-2, respectively, to enable the exchange of data between the electronic entity 100-1 and the electronic device 200-1 and between the electronic entity 100-2 and the electronic device 200-2.

Moreover, the electronic devices 200-1 and 200-2 are interlinked by their long range communication interface (reference 215 in FIG. 2) via, for example, the Internet network.

Thus, it is possible to transfer data, in particular data representative of rights, from the electronic entity 100-1 to the electronic entity 100-2, and vice versa.

FIG. 4 illustrates an exemplary algorithm that can be used to implement the invention in the system illustrated in FIG. 3.

To simplify the description, it is in this case assumed that the owner of the electronic entity 100-1 is the debitor of a right and that the owner of the electronic entity 100-2 is the creditor of this right.

To launch the transaction (step 400), the debitor uses the electronic device 200-1. He places his electronic entity 100-1 close to the USB key 220-1 to enable the exchange of data between these two systems according to a standard communication mechanism, for example conforming to the NFC standard.

A transaction management application is launched on the electronic device 200-1, before or after having placed the systems 100-1 and 220-1 close to one another. Such an application may have been previously stored in the electronic device 200-1 or may be received from the electronic entity 100-1, automatically or at the request of the user.

If the application has been launched on the electronic device 200-1 and if the electronic entity 100-2 is not close to the USB key 220-2 to enable the exchange of data between these two systems, an alert message is, preferably, displayed on the electronic device 200-1 to prompt the debitor to approach the electronic entity 100-1 of the USB key 220-1.

This application can be launched by the user or launched automatically when the electronic entity 100-1 is placed close to the USB key 220-1, possibly after having been transferred from the electronic entity 100-1.

Using this application, preferably comprising a graphical interface, and input means such as the means 205, the debitor specifies, for example, the transaction type, the identifier of the right or of a portion of a right that has to be transferred and the identity of the creditor. The identity of the creditor can in particular be any identifier, a telephone number or an electronic address. The identity of the creditor must allow a message to be transmitted to the latter. Some of this information, in particular the identifier of the right or of a portion of a right that has to be transferred, is transmitted to the electronic entity 100-1 which creates a transaction command (step 405).

The electronic entity 100-1 encrypts and signs this information using a previously stored key, public (preferably that of the creditor) or private, and an algorithm such as the RSA (acronym based on the names of the authors of this algorithm: Rivest, Shamir and Adleman), ECC (Elliptice-curve cryptography), AES/DES (Advanced Encryption Standard/Data Encryption Standard) algorithms.

The key used to encrypt and sign the information can be linked to the creditor, that is, determined on the basis of his identifier.

It should be noted that, thanks to this security, an operator, for example a telecommunications operator, a bank or an administration, can distribute such electronic entities and keep control of the rights exchanged between the electronic entities, the second electronic entity (100-2) checking the authenticity of the sender of the signed item of data representative of the transferred right.

The encrypted and signed information that forms the transaction command is then transmitted to the electronic device 200-1, via the USB key 220-1, to be inserted in a message addressed to the creditor. Such a message can be, for example, an electronic mail, an SMS (short message service) or an MMS (multimedia messaging service).

The insertion of the encrypted and signed information in the message addressed to the creditor can be performed automatically by the application used by the debitor to launch the transaction or can be performed by the debitor himself.

The message can also include the application enabling the creditor to process the message received to perform the transaction.

The message comprising the encrypted and signed information is then transmitted to the creditor (step 410).

On receipt of the message (step 415), the electronic device of the debitor (200-2) launches, preferably automatically, the application for processing the message received to perform the transaction. This application can be previously installed on the electronic device 200-1, stored in the electronic entity 100-2 and transmitted to the electronic device 200-1, at the request of the latter or automatically when the electronic entity 100-2 is placed close to the USB key 220-2, or transmitted with the message.

If the electronic entity 100-2 is not close to the USB key 220-2 to enable the exchange of data between these two systems, an alert message is, preferably, displayed on the electronic device 200-2 to prompt the creditor to approach the electronic entity 100-2 of the USB key 220-2.

The encrypted and signed information is extracted from the received message and transmitted to the electronic entity 100-2 where it is decrypted and where the debitor is authenticated by checking the signature. These signature decryption and verification operations are performed using a previously stored key corresponding to the key used for the encryption and signing operations.

If the debitor is authenticated (step 425), the transaction is performed (step 430); an item of data representative of the right is created or modified in a memory of the electronic entity 100-2 according to the information received to enable the subsequent use of the corresponding right.

Transaction processing information is, preferably, generated in the electronic entity 100-2 to provide an indication of the execution of the transaction (step 435). In a particular embodiment, this information can correspond to at least three distinct values to indicate that the transaction has been performed, that the transaction has not been performed but the debitor has been authenticated, and that the transaction has not been performed and that the debitor has not been authenticated. This processing information is advantageously signed using the public key of the debitor or a private key.

The signed processing information is transmitted to the electronic device 200-2, via the USB key 220-1, where it is inserted into a message addressed to the debitor. Once again, this message can be, for example, an electronic mail, SMS or MMS.

According to a particular embodiment, when a transaction is launched by a debitor, the item of data representative of the transferred right is deleted in a way that is conditional on the electronic entity of the debitor. Thus, if this right is no longer available for the debitor, the item of data representative of the latter is actually deleted only on receipt of the transaction confirmation message, preferably after authentication of the creditor.

Again according to a particular embodiment, after authentication of the debitor, the creditor transmits the transaction message to a trusted third party which itself performs the transaction. The message forwarded by the creditor can comprise information relating to the creditor, for example references of an account to be credited. According to this embodiment, the right is not directly exchanged between two electronic entities but passes through an account managed by a third party.

Again according to a particular embodiment, the debitor is prompted to enter a personal code, for example a PIN (personal identification number) code, when he wants to perform a transaction. This code, entered on the electronic device 200-1, is transmitted to the electronic entity 100-1 where it is compared to a previously stored code to authenticate the debitor. If the latter is not authenticated, he cannot transfer rights whose representative data are contained in the electronic entity 100-1.

According to another embodiment, the transaction is launched by the creditor from the electronic device 200-2. The step 400 then consists in particular in inputting the information required for the transaction, for example, the transaction type, the identifier of the right or of a portion of a right that has to be transferred and the identity of the debitor. The identity of the debitor can, in particular, be any identifier, a telephone number or an electronic address. The identifier of the debitor must enable a message to be transmitted to the latter.

Advantageously, some of this information, in particular the identifier of the right or of a portion of a right that has to be transferred, is transmitted to the electronic entity 100-2 which encrypts and signs this information to enable the debitor to authenticate the creditor. The encrypted and signed information is then transmitted to the electronic device 200-2.

The information required for the transaction, possibly encrypted and signed, is then transmitted to the debitor with the identifier of the creditor. After a possible authentication of the creditor, the debitor can validate the transaction and the steps 405 to 435 are carried out.

FIG. 5 illustrates a second exemplary portable electronic entity suitable for implementing the invention, the electronic entity itself comprising long range communication means.

As represented, the portable electronic entity 500 is in this case a mobile telephone which comprises a mobile telephony module 505, advantageously linked to a loudspeaker 510 and to a microphone 515. The mobile telephone 500 also comprises a central processing unit 520, also called CPU, and, preferably, a screen 525.

The mobile telephone 500 also comprises a short range communication module 530, advantageously a short range wireless communication module. The module 530 is, for example, of the NFC type. The module 530 can be directly implanted in the mobile telephone 500, for example in the form of an integrated circuit and antenna, or inserted in the mobile telephone 500, for example, in the form of a microcircuit card comprising an integrated antenna, in particular a SIM (subscriber identity module) card.

The mobile telephone also comprises an input device 535, such as a keyboard or an equivalent device, for entering rights references, amounts of values and/or commands. The input device 535 forms, in conjunction with the screen 525, a user interface. The input device 535 can also be incorporated in the screen 525 in the form of a touch screen.

The mobile telephone 500 also comprises a memory module 540 suitable for storing at least partially an application 545 enabling rights to be exchanged using the mobile telephony module 505 and the use of rights using the short range wireless communication module 530. The exchange of rights can also be carried out from a data communication module (not represented), for example a WiFi module.

The memory module 540 is also suitable for storing data 550 representative of a right or of amounts of values.

The mobile telephone 500 thus comprises all the means required to implement the invention. In particular, the mobile telephone can be used to transfer rights according to the diagram of FIG. 3 and the algorithm of FIG. 4, the mobile telephone 500 being used instead of the electronic entity 100-1, the electronic device 200-1 and the USB key 220-1, or instead of the electronic entity 100-2, the electronic device 200-2 and the USB key 220-2.

Naturally, to satisfy specific requirements, a person skilled in the field of the invention can apply modifications to the above description.

The invention claimed is:

1. A method of transferring at least one item of data representative of at least one right between two portable electronic entities, at least one of said portable electronic entities comprising a short range wireless communication device configured to transmit said at least one item of data to use said at least one right, said portable electronic entities configured to communicate directly or indirectly via a long range communication interface, the method comprising:
   receiving said at least one item of data by one of said portable electronic entities from the other of said portable electronic entities via said long range communication interface;
   authenticating said at least one item of data by said one of said electronic entities;
   storing said at least one item of data in said one of said electronic entities; and
   transmitting said at least one stored item of data via said short range wireless communication device to use said at least one right represented by said at least one item of data,
   wherein said reception step comprises a step of reception of an application configured to process said at least one received item of data representative of the at least one right, the application being received by the one of the portable electronic entities in a same message with the at least one item of data.

2. The method according to claim 1, wherein said step of reception of said at least one item of data comprises a step of reception of said at least one item of data from an electronic device distinct from said portable electronic entities using the short range wireless communication device.

3. The method according to claim 1, wherein the application is automatically launched when the at least one stored item of data is transmitted via said short range wireless communication device.

4. A method of transferring at least one item of data representative of at least one right between two portable electronic entities, at least one of said portable electronic entities comprising a short range wireless communication device configured to transmit said at least one item of data to use said at least one right, said portable electronic entities being suitable for communicating directly or indirectly via a long range communication interface, the method comprising the steps of:
   signing said at least one item of data by one of said portable electronic entities;
   transmitting said at least one signed item of data to the other of said portable electronic entities, said at least one signed item of data being transmitted via said long range communication interface;
   transmitting said at least one stored item of data via said short range wireless communication device to use said at least one right represented by said at least one item of data; and
   transmitting an application configured to process said at least one signed item of data representative of the at least one right to the other of said portable electronic entities, the application being transmitted to the other of the portable electronic entities in a same message with the at least one signed item of data.

5. The method according to the claim 4, wherein said signing step comprises a step of selection of a cryptographic key stored in said one of said electronic entities to sign said at least one item of data.

6. The method according to claim 4, further comprising a step of encryption of said at least one item of data.

7. The method according to claim 4, wherein said step of transmission of said at least one signed item of data to the other of said portable electronic entities comprises a step of transmission of said at last one signed item of data to an electronic device distinct from said portable electronic entities using the short range wireless communication interface.

8. The method according to claim 4, wherein said at least one item of data is transmitted in a message of electronic message, SMS or MMS type.

9. The method according to claim 4, wherein the application is automatically launched when the at least one stored item of data is transmitted via said short range wireless communication device.

10. A non-transitory computer-readable storage medium on which is stored computer-executable code of a computer program for transferring at least one item of data representative of at least one right between two portable electronic entities, at least one of said portable electronic entities comprising a short range wireless communication device configured to transmit said at least one item of data to use said at least one right, said portable electronic entities being configured to communicate directly or indirectly via a long range communication interface, the computer program comprising instructions which, when executed by a computer, causes the computer to perform each of the steps of:
   receiving said at least one item of data by one of said portable electronic entities from the other of said portable electronic entities via said long range communication interface;
   authenticating said at least one item of data by said one of said electronic entities;

storing said at least one item of data in said one of said electronic entities; and transmitting said at least one stored item of data via said short range wireless communication device to use said at least one right represented by said at least one item of data, wherein said reception step comprises a step of reception of an application configured to process said at least one received item of data representative of the at least one right, the application being received by the one of the portable electronic entities in a same message with the at least one item of data.

11. The non-transitory computer-readable storage medium according to claim 10, wherein the application is automatically launched when the at least one stored item of data is transmitted via said short range wireless communication device.

12. A device for transferring at least one item of data representative of at least one right between two portable electronic entities, the device comprising:
- a short range communication device configured to transmit said at least one item of data to use said at least one right;
- a communication device configured to transmit said at least one item of data between said portable electronic entities via a long range communication interface;
- a storage storing said at least one item of data;
- a processor configured to receive or transmit said at least one item of data and an application configured to process the at least one item of data representative of the at least one right and configured to use the at least one right associated with said at least one item of data, the at least one item of data and the application configured to process the at least one item of data being received or transmitted together in a same message; and
- a transmitter configured to transmit said at least one stored item of data via the short range wireless communication device to use said at least one right represented by said at least one item of data.

13. The device according to claim 12, wherein the processor is configured to sign, encrypt, authenticate and/or decrypt said at least one item of data.

14. The device according to claim 12, wherein said storage means stores the application configured to process the at least one item of data.

15. The device according to claim 12, wherein the short range communication device are configured to transmit said at least one item of data between the storage and the long range communication interface.

16. The device according to claim 12, wherein the short range communication device conform to the NFC standard.

17. The device according to claim 12, wherein said long range communication interface is at least partially a mobile telephony type and/or comprises a network interface of Internet type.

18. The device according to claim 12, wherein the application is automatically launched when the at least one stored item of data is transmitted via said short range wireless communication device.

* * * * *